June 25, 1940.  G. B. MOROSS  2,205,574
OSCILLATIVE INDICATING INSTRUMENT
Filed June 10, 1938  4 Sheets-Sheet 1
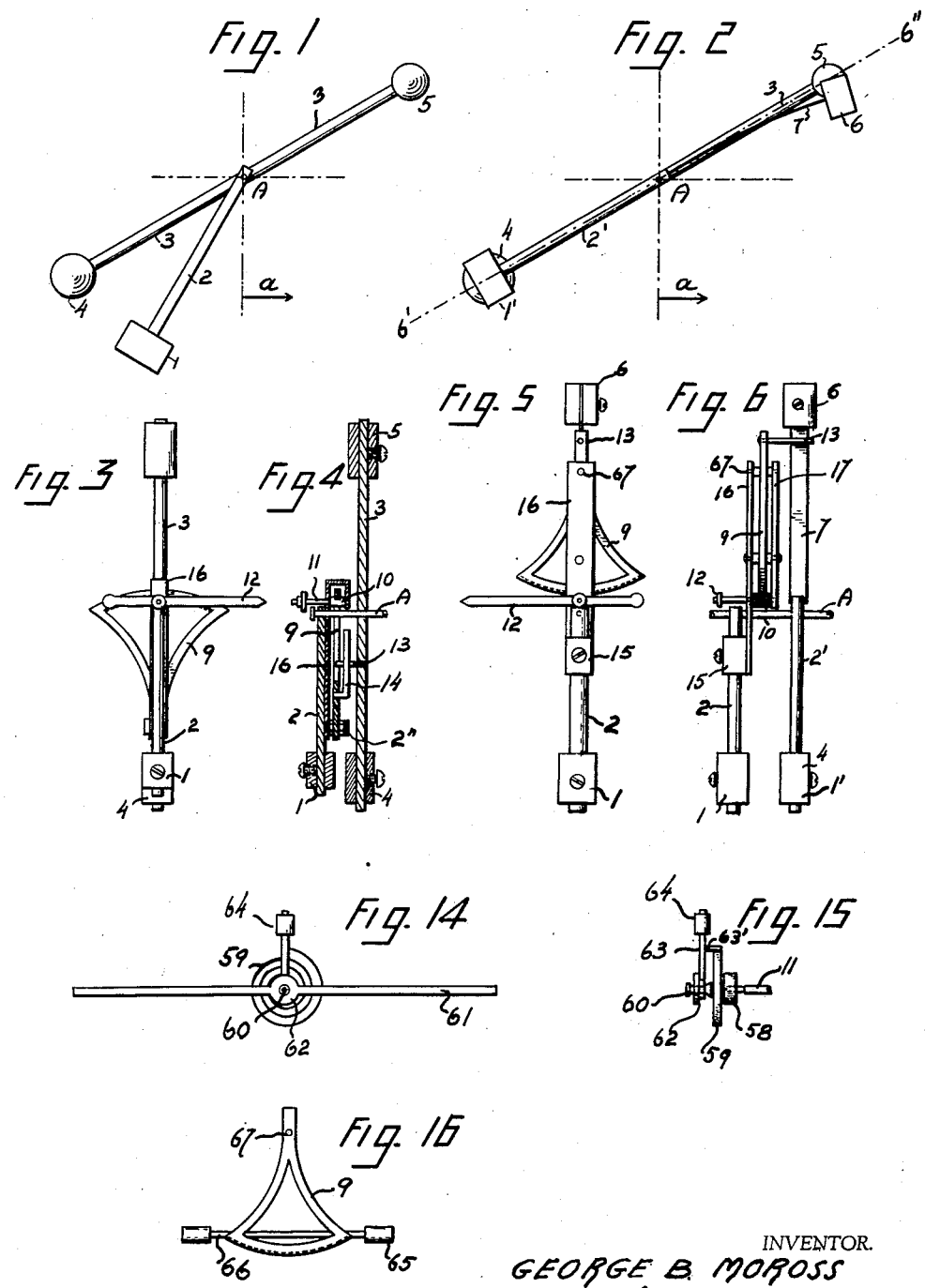
INVENTOR.
GEORGE B. MOROSS
BY Arthur H. Serrell
his ATTORNEY.

June 25, 1940.  G. B. MOROSS  2,205,574
OSCILLATIVE INDICATING INSTRUMENT
Filed June 10, 1938    4 Sheets-Sheet 2
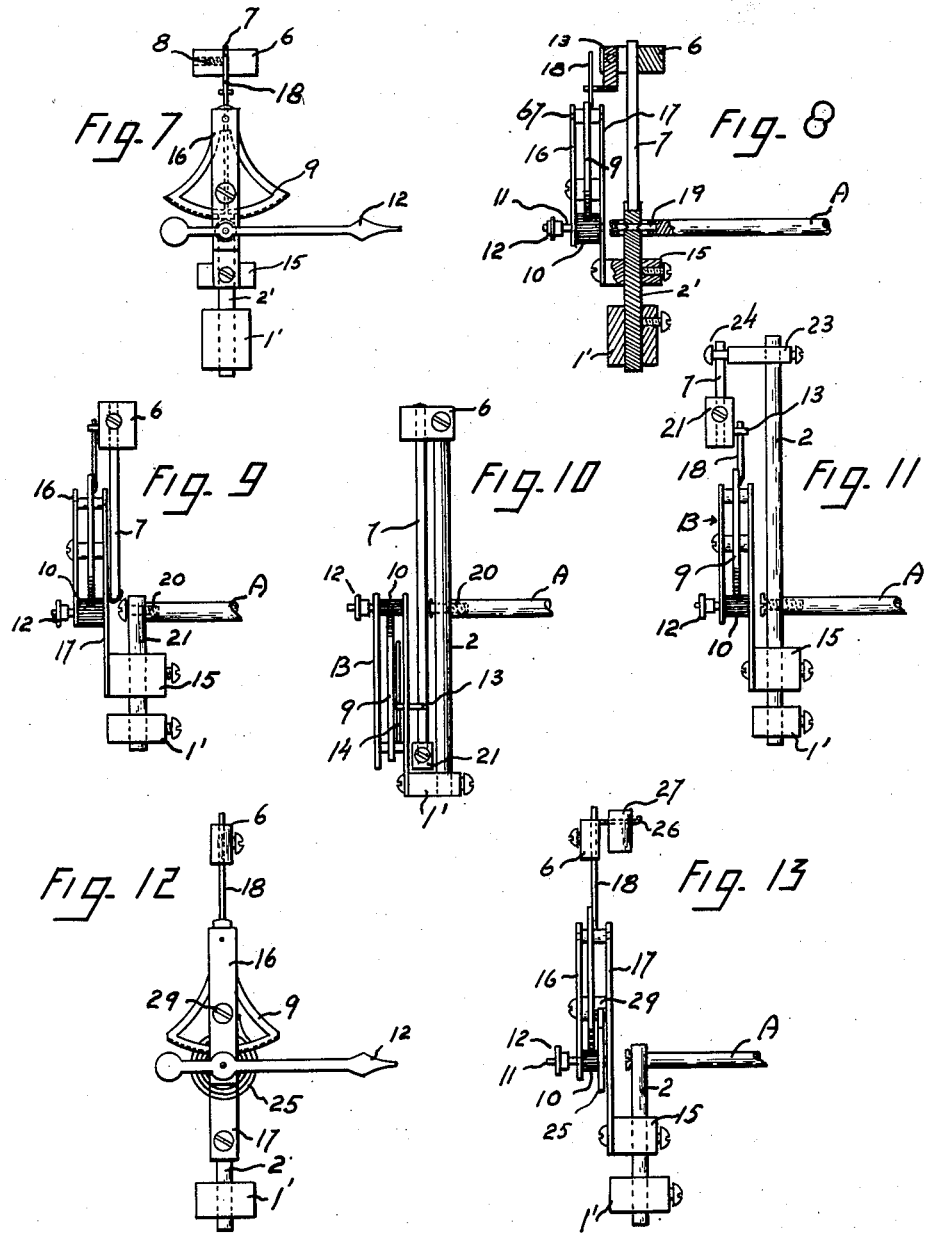
INVENTOR.
GEORGE B. MOROSS
BY Arthur H. Serrell
his ATTORNEY.

June 25, 1940. G. B. MOROSS 2,205,574
OSCILLATIVE INDICATING INSTRUMENT
Filed June 10, 1938 4 Sheets-Sheet 3

INVENTOR.
GEORGE B. MOROSS
BY Arthur H. Serrell
his ATTORNEY.

June 25, 1940.　　　　G. B. MOROSS　　　　2,205,574
OSCILLATIVE INDICATING INSTRUMENT
Filed June 10, 1938　　　4 Sheets-Sheet 4
Fig. 23
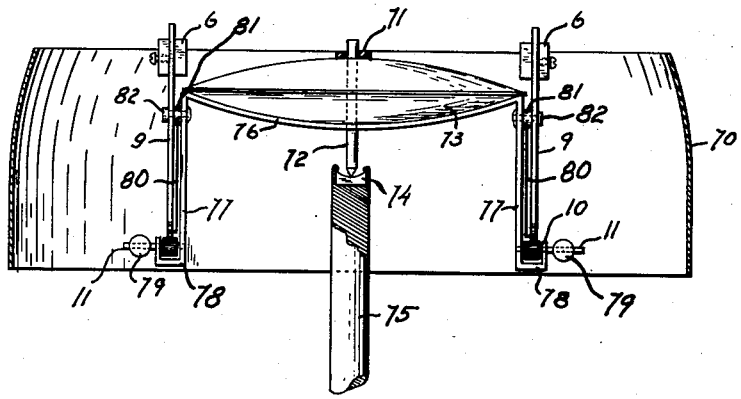
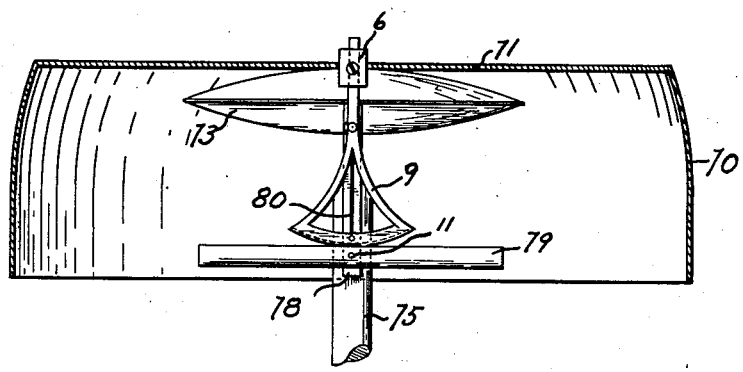
Fig. 24
Fig. 25
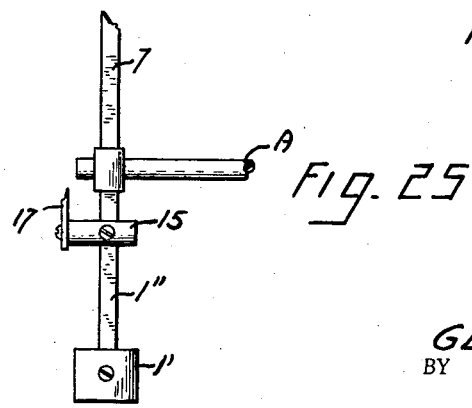
INVENTOR.
GEORGE B. MOROSS
BY Arthur H. Serrell
his ATTORNEY.

Patented June 25, 1940

2,205,574

UNITED STATES PATENT OFFICE 2,205,574

OSCILLATIVE INDICATING INSTRUMENT

George B. Moross, Jackson Heights, N. Y.

Application June 10, 1938, Serial No. 212,983

9 Claims. (Cl. 33—215)

My present invention relates to an improvement in oscillative indicating instruments.

The primary object of the invention is to provide a pendulous actuated mechanism which is operatively responsive to changes in velocity of the instrument to tend to retain the indicating means thereof in a desired predetermined plane or position.

The instrument constructed in accordance with the inventive concepts herewith disclosed is adaptable for use in various practical and commercial embodiments, being utilizable in the field of aviation in the form of a flight indicator, artificial horizon, drift meter, accelerometer, compass level and in other kindred manners. The device is furthermore obviously adaptable for use as an accelerometer or level indicator on substantially any moving instrumentality or vehicle affected by the forces of acceleration or retardation during operation thereof.

An important object of the invention is to construct an instrument of this character employing a pendulous actuating body having a relatively long period of oscillation and/or a gravitational center relatively near its point or axis of suspension.

Another object of the invention is to provide a device of this character utilizing pendulous means for tending to fluctuably maintain a portion of a mechanism, connected to said means, in a predetermined desired indicating position.

The main purpose of the invention is to provide an instrumentality of this character which will include a fluctuable indicating means of any desirable construction therein and provide a mechanism therewith for maintaining the indicating means in a predetermined relatively true position uninfluenced by the forces of acceleration or retardation affecting the instrument proper.

A still further object is to employ a simplified unitary oscillative body for the purposes of the invention which has one or more flexible supporting arms for the weights thereof, which weights are affected by the force of gravity during the operation of the device to obtain a proportional compensating movement utilizable by a mechanism designed to accomplish the retention of an indicator for the device in a substantially predetermined plane.

Another object of the invention is to form an instrument of this character in which the unitary pendulous body includes as portions of the same both a weight actuated or supporting resilient member and an indicating mechanism.

My invention further includes other objects, advantages and novel features of design, construction and arrangement, hereinafter more particularly referred to, in connection with the accompanying drawings in which Fig. 1 is a detail view of two pendulous bodies having different periods of oscillation, the same indicating the principle of operation of the actuating means employed in this form of the invention.

Fig. 2 is a view similar to Fig. 1 indicating the effect of the force of gravity on the portion of the pendulous device having a flexible arm for its supported upper weight, the same clearly demonstrating the preferred principle of operation employed in the simplified form of the present inventive disclosure.

Fig. 3 is a front view of an instrument demonstrating the teachings of the present invention.

Fig. 4 is a side view of the instrument shown in Fig. 3.

Fig. 5 is a further front view of a modification of the demonstrative instrument shown in Figs. 3 and 4, the device in this instance employing a flexible arm pendulous means.

Fig. 6 is a side view of the device shown in Fig. 5.

Fig. 7 is a front view of the preferred unitary pendulous type of indicating instrument constructed in accordance with the inventive concepts herewith disclosed.

Fig. 8 is a side view of the instrument shown in Fig. 7.

Fig. 9 is a side view illustrating a modified form of the unitary pendulous type of instrument forming the present inventive subject matter as disclosed in Figs. 7 and 8.

Figs. 10 and 11 are further side views illustrating other modifications of the preferred form of the invention.

Fig. 12 is a front view of a still further modification of the device.

Fig. 13 is a side view of the constructional form of the invention shown in Fig. 12.

Fig. 14 is an enlarged front detail view of the preferred form of indicating means employable in accordance with the teachings of the present inventive disclosure.

Fig. 15 is a side view of the detail indicating means shown in Fig. 14.

Fig. 16 is a front detail view of a modified form of sector gear forming part of the compensating means or mechanism disclosed herewith, the sector gear in this instance being provided with a counterweight for assisting in the damping of the instrument.

Fig. 23 is a detail view showing the application of the invention for use as a compass level.

Fig. 24 is a side view of the device shown in Fig. 23, and

Fig. 25 is a partial side view of a further modification of a unitary pendulous instrument employing two flexible extending arms for supporting the weights of the device.

Figure 17:
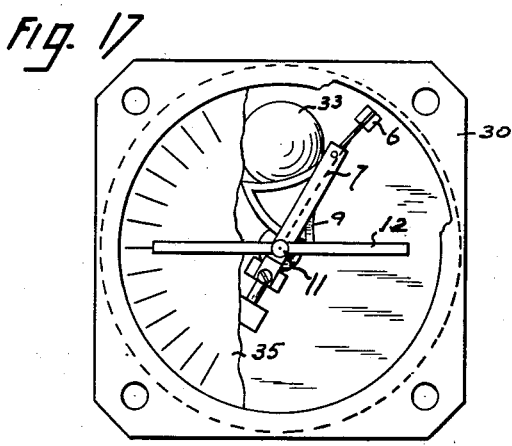
Fig. 17 is a detail front view showing the preferred form of instrument mounted in a suitable manner for use in a casing enclosure provided for the same.

With particular reference to Figs. 1 and 2 of the drawings, the principle of operation of the pendulous actuated instrument herewith disclosed is clearly shown. In Fig. 1 a simple pendulum is shown formed by the weight 1 and arm 2, the point or axis of suspension of the same being designated at A. A further pendulum being in the same horizontal axis of suspension is also employed, this device being composed of weights 4 and 5 and the extending arms 3 therefor. In the second pendulum the weight 4 is slightly heavier than the weight 5 so that the center of gravity of the same is below and relatively near its axis or point of suspension A. The first pendulous body has a relatively short period of oscillation due to the distance of its center of gravity from its point of suspension, in comparison with the long period of oscillation of the second pendulous body when both of the same are subjected to the same external forces. Both pendulums are mounted to freely oscillate about axis A and if the same are subjected to horizontal acceleration by movement in the direction of the arrow $a$ in the drawings, the second pendulum is deflected from a vertical position to a greater extent than the first pendulum. The relative deflected positions of the pendulums are clearly indicated in this figure of the drawings. In a practical formation of the present invention an instrument is constructed providing a mechanism for employing this difference in period of oscillation to accomplish the desired result of maintaining an indicating means for the instrument in a predetermined position or plane. In this demonstrative form of application of the invention two related pendulous devices or bodies are shown.

The preferred form of the pendulous actuating means provided is indicated in Fig. 2, the same consisting of a single or unitary pendulous device having long period operating characteristics. A pendulum of this nature, such as designated in Fig. 1 by the reference numbers 4, 3, 5 is also shown in this figure of the drawings. For comparison only, a pendulum having the same period characteristic indicated at 1', 2', 7 and 6 is shown with the former pendulum, both of the same being capable of being oscillated about their common horizontal axis A. It will also be understood that the force of acceleration indicated at $a$ is adapted to apply equally to both pendulums. The last named pendulum is overweighted slightly so that its center of gravity is similarly situated near and below its point of suspension A. The lower or heavier weight of this pendulum is designated at 1' and the other or lighter weight is indicated by the numeral 6. The extending arm 2' for the weight 1' is of relatively stiff construction while the upwardly extending arm 7 for the weight 6 is flexible or resilient. For a given force of acceleration or retardation of the device the pendulum 1', 2', 7 and 6 deflects or swings on its axis as indicated in the drawings, Fig. 2, and the weight 6 thereof supported on the flexible arm is proportionally affected by the force of gravity thereon in relation to the arc of movement of the pendulum to move out of alignment with the true longitudinal axis of the body, which axis is designated at 6'—6'' in the drawings. The gravitational deflection of the flexibly supported pendulous weight is employed to actuate a mechanism to accomplish the purpose of the invention.

Similar or corresponding parts of the instrument as hereinafter referred to are designated by the same reference numbers.

In demonstrating the operating principle of the invention, reference is now made to Figs. 3 and 4 of the drawings which disclose a complete instrument adaptable for indicating horizontal acceleration of an airplane or other moving apparatus, the same consisting of two pendulums and an indicating means or mechanism connecting the same. Shaft A which is firmly positioned, in any suitable manner not shown in the drawings, constitutes the pivotal axis or suspension point for the pendulums. The simple pendulum consists of the parts as heretofore referred to namely weight 1 and arm 2. The pendulum having a relatively long period of oscillation is likewise designated by the corresponding reference numbers 4, 3 and 5. A supporting plate or frame 16 is permanently attached to the arm 2, the same pivotally supporting, as indicated at 2'', a sector gear 9 having inside gear teeth adapted to mesh with a small pinion 10. The pinion 10 is mounted on a stem or shaft 11 rotatably secured in the frame or plate 16, which stem extends or protrudes exteriorly of its supporting structure. On the end of the shaft 11 is located a pointer 12 or indicator for the instrument, the same being fluctuably positioned with relation to the actuating pendulums. A connecting mechanism for the respective pendulums includes a suitable fork 13 provided with a slot which slideably grips a pin construction, as indicated at 14, which is fixed in position to the rear of the sector gear 9. Both pendulums are free to swing or oscillate on the shaft A and upon change in velocity of movement of the instrument body, both are equally affected by the forces of acceleration or retardation resulting therefrom. With a given side acceleration both pendulums may be deflected into a position such as shown in Fig. 1. The fork 13, in the operation of the compensating mechanism, deflects gear 9 and pinion 10 from a neutral position to the side opposite to the deflection of the pendulums. In a properly adjusted and calibrated instrument, this movement proportionally compensates for the amount of deflection of the pendulums so that the indicator 12 remains or tends to be maintained in a desired predetermined plane or position. It is herein pointed out that the adjustment motion of the compensating mechanism to accomplish the purpose of the invention is attained by utilizing the difference in deflection of the pendulums employed or in other words the difference in their respective period characteristics. The compensating movement exerted on shaft or stem 11 by the secondary pendulum through reason of its greater deflection maintains the indicator 12 in a preferred horizontal position against the influence of the primary or simple pendulum of the instrument. The amount of acceleration could be easily read on a dial, not shown in these figures of the drawings, attached to the simple pendulum although such a dial or graduated enclosure is obviously not necessary for the operation of the instrument disclosed.

The demonstrative type of instrument shown in Figs. 5 and 6 includes corresponding parts to the instrument heretofore described and in addition to the same provides for the use of the flexible arm type of pendulous device disclosed in Fig. 2 of the drawings. In this instance the frame support 16, 17 is adjustably mounted on collar 15 located on the arm 2. A shaft 67 rotatably situated in frame 16, 17 is utilized in the present instance to hold the sector gear 9 which is exteriorly toothed. This type of instrument may be calibrated by hand, through the adjustment of collar 15 on the arm 2 or by changing the positions of the pendulous weights proper, which it is not possible to do with the type of device illustrated in Figs. 3 and 4. In the operation of this type of instrument, if it is deflected from a neutral vertical position with no acceleration acting, the weight 6 deflects the spring 7, by action of gravity thereon as described in connection with Fig. 2 of the drawings, and this additional movement is conveyed through fork 13, sector gear 9 and pinion 10 to assist in maintaining the indicating hand 12 in its original horizontal position. Otherwise in taking into account this additional motion which permits calibration of the instrument by hand, the operation of the device is similar to that already described in connection with the instrument shown in Figs. 3 and 4 of the drawings.

The preferred form of pendulous actuating means for the instrument is shown embodied therewith, together with the indicator mechanism, in Figs. 7 and 8 of the drawings. In this construction, a unitary pendulous body is employed having the operating characteristics described with relation to pendulum 1', 2', 7 and 6 in Fig. 2, the same solely employing the gravitational force affecting the weight 6 during the operation of the instrument, through reason of the angular deflection of the body, to provide the actuating motion for the compensating indicative mechanism therewith. The instrument consequently employs a gravitationally effectual pendulous body for accomplishing the objects of the invention. In the detail construction of the same, the pendulum 1', 2', 7 and 6 is mounted to freely oscillate on shaft 19, corresponding to its pivotal axis or suspension point A. The flat spring 7 is rigidly mounted on 2'. The rear plate 17 of the mechanism supporting frame 16 is also attached in an adjustable manner to 2' through the collar 15. The upper weight 6 includes a slot for receiving the end of the spring 7 and fork 13. A screw 8 or other suitable means is employed in locking these parts of the device together after the positions of the same have been properly determined through calibration of the instrument. To the externally toothed sector gear 9 employed in this instance, a pin 18 is soldered, which pin is adapted to be slideably positioned between the fingers of the fork 13. The indicator means or hand 12 and its shaft 11 and the shaft gear 10 meshing with the sector gear are of the same construction as that heretofore described in connection with the forms of the invention shown in both Figs. 3 and 5. The indicator instrument constructed in accordance with the present invention comprises a pendulous body including as a portion of the same both a weight actuated or supporting resilient member and an indicating mechanism, the device having connecting means for said member and mechanism whereby the indicator is maintained, through the influence of the force of gravity upon the resilient member of the instrument, in a predetermined desired position.

Calibration of the instrument is accomplished in the following manner. Initially the positions of the weight 6 and fork 13 are suitably adjusted so that when the pendulum is manually deflected from a vertical position, the weight 6 proportionally to the degree of movement of the pendulum, additionally deflects the spring 7 by the action of gravity thereon. This additional deflection of the weight 6 acts simultaneously with the movement of the entire pendulous body to actuate the sector gear 9, through the fork 13 and pin 18, to rotate the gear 10 in the opposite direction to thus fluctuably tend to maintain the indicator 12 in a predetermined plane. The position of retention of the indicating pointer 12 has been shown in the drawings as horizontal although obviously the same may be set in any desired plane to accomplish the purposes of the invention for a given instrumental use without departing from the nature and spirit of the present disclosure. After this initial setting, the bottom weight 1' is positioned, by means of the set screw therewith, so that the unitary pendulous body is only slightly bottom heavy. As a consequence of this second setting a center of gravity of the pendulous unit is regulated so as to be relatively near and below the suspension point A of the instrument, thus providing an actuating body of this type having a relatively long period of oscillation.

With this manual calibration the complete instrument, under influences of acceleration or retardation, shows very little error. The small error present could be further corrected by slightly over calibrating the device so that the indicator would move to a small degree either upward or downward when the pendulum is deflected. The deflection by hand corresponds in actual operation of the device to the position of the pendulum at the end of a turn of an airplane or a sudden retarding of the velocity of the device with which the instrument is used. In calibrating the pendulum immediately swings back to a vertical position, while in actual use a short period of time elapses depending on the damping of the instrument during which the pendulum is inclined with no external forces acting upon it and a small error in over calibration is not noticeable.

Reference number 67 in Fig. 8 of the drawings designates the rotatably mounted shaft in the frame 16, 17 of the device upon which the sector gear 9 is secured.

Figs. 9, 10 and 11 of the drawings show modified forms of the spring type of pendulous actuating bodies employed in accordance with the teachings of the present invention. In Fig. 9, the spring 7 is mounted to the rear of the back frame 17. Also in this disclosure screw 20 constitutes the pivotal axis for the arm 2' of the pendulous body.

The construction employed in Fig. 10 permits the use of a relatively long spring 7 for the pendulum. The structure provides the connection of the disclosed mechanism, indicated at B, to the lowermost pendulous weight 1'. To the upper weight 6 on stem 2 is soldered or otherwise positioned the spring 7 having at its free end a weight 21. The spring 7 is joined with the mechanism B through means of the fork 13 and pin 14 which operates the pivotally mounted sector gear 9.

In Fig. 11, a cross bar 23 is attached to the upper part of the arm 2. A pin 24 contains a slotted portion in which the spring 7 is soldered or otherwise firmly secured. An adjustable weight 21 hangs from the lower portion of the spring 7. The weight 21 is connected to the indicating mechanism B through means of fork 13 and pin 18 which is directly soldered to the sector gear 9. Each of the pendulous devices illustrated in Figs. 9, 10 and 11 are free to oscillate on shaft A and operate in the manner described heretofore in connection with the inventive disclosure as shown in Figs. 7 and 8 of the drawings.

Still further modifications of the spring type pendulous devices are illustrated in Figs. 12 and 13. In these constructions a hair or coil spring 25, which functions in the same manner in the mechanism as the flat type of spring 7, is employed. This spring connects the rotatably mounted stem or shaft 11 with a spacer element 29 in the frame 16, 17 of the body of the device. The sector gear 9 in this form of the invention is actuated through means of an extension arm 18 on which the upper weight 6 of the pendulum is secured. In Fig. 13, the weight 6 is shown of a construction facilitating the utilization of an added pivotally mounted pendulous weight 27. An extending shaft 26 is employed for this purpose. The operation of the devices shown in these figures is the same as that heretofore described for the preferred embodiment of the invention as illustrated in Figs. 7 and 8.

Figure 18:
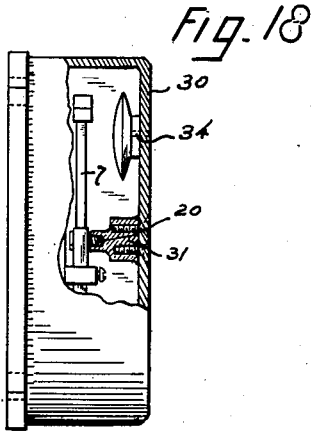
Fig. 18 is a side view of the construction disclosed in Fig. 17.

With reference to Figs. 17 and 18 of the drawings, application of the inventive concepts disclosed herein is made to provide a bank indicating device for an airplane. The pendulous instrument, for purposes of illustration, as shown in Figs. 7 and 8 is utilized in this connection. A pivot 20 for the pendulous instrument is screwed to a support 31 fastened to a casing enclosure designated at 30. The front of the casing is designed to provide a suitably graduated dial 35 through which the indicator hand 12 of the instrument is visible. In order to obviate unnecessary fluctuation of the indicator hand 12, the casing enclosure for the instrument is filled with a light oil. To prevent the appearance of air bubbles within the casing and to release and prevent the formation of pressure therein, a small diaphragm 33 is employed having an opening 34 to the atmosphere. The operation of the instrument in the casing is as heretofore described, the indicator tending to remain in a horizontal position, upon operation thereof, while the dial proper of the casing enclosure on the instrument board of the airplane moves to show the degree of the bank.

On many movable scientific instruments, it is very important to maintain a vertical, horizontal or other given plane on some portion of the device which would be unaffected by the influences of acceleration or retardation. Gyroscopes are used in practice to accomplish this purpose, but the same are relatively expensive, require power to drive and in many instances are also affected by long side acceleration of the same. By combining two pendulums, constructed in accordance with the teachings of the present invention, located in two vertical planes at right angles to one another, it is possible to obtain a satisfactory device accomplishing the same results as a gyroscope.

Figure 19:
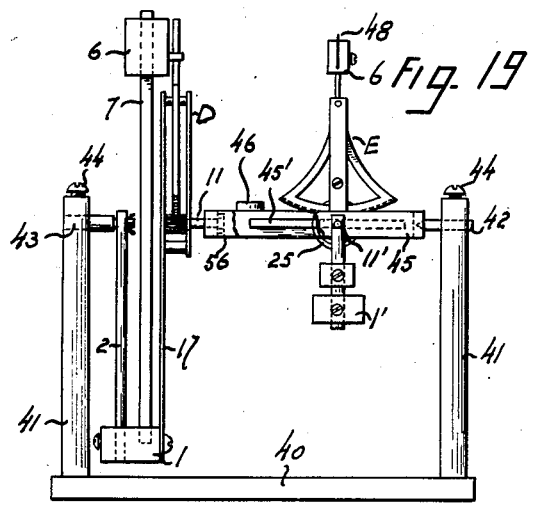
Fig. 19 is a detail front view of a special mechanism controllable through means of instruments constructed in accordance with the teachings of the present invention in which a central part thereof is adapted to be retained in an horizontal plane.
Figure 20:
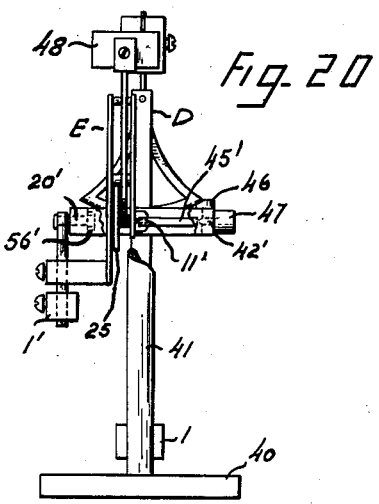
Fig. 20 is a side view of the mechanism shown in Fig. 19.

Referring particularly to Figs. 19 and 20, in this connection, a device of this character may be constructed comprising a base 40 having attached uprights 41 for supporting the mechanism on pivots 42 and 43 which are fastened in the uprights by means of screws 44. The construction of the left pendulous instrument, Fig. 19, is essentially the same as illustrated in Fig. 9 of the drawings the same being designated at D. The construction of the pendulous device on the right in this mechanism is the same as shown in Fig. 12 and is indicated in the drawings generally by the reference letter E. The stem 11 of the mechanism D is attached to a square shaft 45 by means of a nut 56. The opposite end of this shaft 45 is pivotally retained by the pivot element 42.

On the side of the square shaft 45 is pivotally mounted the pendulous instrument E. The stem 11' of this device is securely fastened to the plate 45' which is also supported by a pivot member 42'. The whole system is properly balanced along both axes by counterweights 46 and 47. A damper 48 is also employed therewith in connection with the upper weight 6 used in the instrument E of the system. The plate 45' is the equivalent of the indicating means, hereinbefore provided, and may be made of a glass surface with graduations or be a mirror or prism. This system operates as a combined instrument so that the plate 45' tends to be maintained in a horizontal position regardless of the actual direction of the forces affecting the same.

Figure 21:
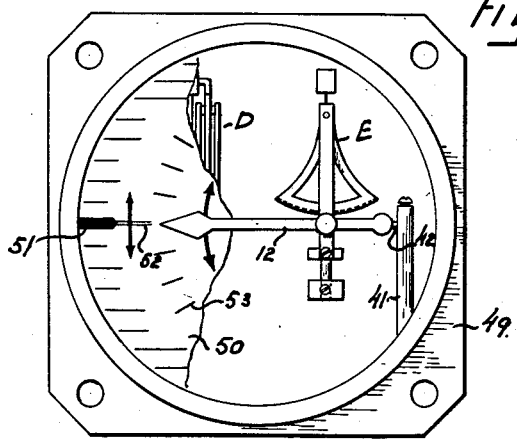
Fig. 21 is a detail front view of a number of connected instruments constructed in accordance with the present invention to indicate a manner in which the same may be mounted in a casing enclosure to form a flight indicator.

With reference to Fig. 21, the same combination of pendulous instruments is shown utilized in a different manner, the instruments in this case being located in a suitable spherical casing provided with a double dial so that the device functions as an artificial horizon instrument for an airplane. In this instance the pendulous instruments, as shown in Fig. 19, are mounted within a spherically shaped case 49 which includes a front glass dial 50 having a zero reading thereon as indicated at 51. The dial 50 is secured in any suitable manner, not herewith shown, to the plate 45, as noted in Fig. 19. The mechanism of the pendulous device E, Fig. 19, is altered so that its stem 11' pivotally carries the indicating pointer 12.

If the casing of this system is tilted backward and forward, the double mark 52 on the dial 50 will remain horizontally stationary, and zero mark 51 tilting with the case will indicate the degree of upward or downward inclination. If the case is tilted sideways, the zero mark 51 will remain on the double dial mark 52, and the hand 12 will indicate by reference to the graduating markers 53 on the dial the degree of inclination of the airplane. The design of the case 49 and the location of the two pendulums could be easily altered, or reversed, or instead of two pendulous instruments on one base, two separate bases could be used.

Figure 22:
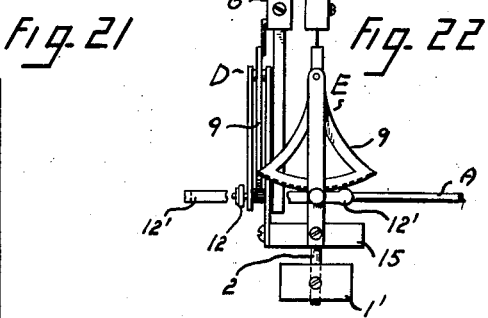
Fig. 22 is a detail front view of a mechanism serving the purpose of the combined instrument shown in Fig. 21 as accomplished with the use of a single pendulous actuating body.

In connection with Fig. 22, instead of employing two pendulous instruments D and E for this purpose, I utilize only one pendulous device having two directions of freedom with two indicating mechanisms operating therefrom. On the shaft A, for this construction, is located a gimbal, not shown, with two pairs of pivots, the same being of any well known construction. This portion of the device is otherwise similar to part 19 designated in Fig. 8 of the drawings. The arm 2 of this pendulum carries the weight 1' and the framework supporting collar 15. On this supporting frame, two mechanisms are attached at right angles to one another. The indicator 12 of the left mechanism D herein follows the heretofore described construction. The other indicator arm 12' for the right mechanism E is elongated and bent at right angles to bring the indicating pointer of the same into a plane parallel with the pointer 12. The operating action of this type of device is similar to that hereinbefore described.

In the type of devices employing the oscillative indicating instruments herewith disclosed damping is an important factor in improving the performance of the same. Inasmuch as the various parts of the instrument have different natural frequencies, instantaneous motion of all of the same simultaneously cannot be achieved. However any standard system of damping the mechanism will operate satisfactorily. I prefer to employ a small vane, such as indicated at 48, on the pendulous instruments and totally submerge the same in a liquid of a desirable viscosity.

Another way of attaining this condition in the instruments is shown by the construction in Figs. 14 and 15 of the drawings. On the regular stem or shaft 11 of the instrument in this construction is situated a hub 58. To the front of the hub 58, I position one end of a hair or coil spring 59 and have a pin 60 soldered thereto. The indicator proper consists of a light and balanced pivot arm 61 having a central piece designated at 62 to the rear of which is permanently attached a vertically extending pin 63 having a weight 64 thereon. The other end of the hair spring 59 is connected to the vertical pin 63, as indicated at 63'. The purpose of this construction is twofold, first to account for the difference in the natural frequencies of the component parts comprising the entire instrument and second to compensate for the small error occurring in actual operation of the device after the same is calibrated by hand.

It was proposed that for accurate indication when side acceleration or retardation is present, the instrument should be statically overcalibrated, that is if the pendulum is deflected by hand, the weight 6 would move the indicator hand 12 to a greater degree than it theoretically should to retain the indicator in the same position. In order to correct this error, two weights as indicated in 65 in the drawings, Fig. 16, are employed with a stem 66 permanently located on the sector gear element 9 of the mechanism. Because the weights are arranged on both sides of the fulcrum bearing 67, in this instance, they oppose each other and tend to maintain the indicator of the instrument in a horizontal plane by their reaction against a sudden change in position.

With reference to Fig. 25 of the drawings, a further modification of the instrument is shown in which the lowermost arm for the supporting weight 1' is also of a flexible construction, the same being designated at 1". The other elements correspond to those shown in Fig. 8 of the drawings and the device functions in a similar manner to the same.

Another illustration of application for the inventive conception disclosed herewith is shown in Figs. 23 and 24 of the drawings in which the same is adapted to compass constructions. For the proper functioning of this type of device it is most important that the magnets or indicating means thereof be maintained in a horizontal position. In the present case, practical application of the indicating means herein is made to control the position of the magnet indicator of a compass.

In the construction shown in this regard, the usual type of compass card is indicated at 70, the same being fastened to the pivot 72 by lugs 71. The pivot 72 carries the float 73 and the support 76 for both of the leveling instruments. Pivot 72 rests on jewel 74 which is embedded in jewel post 75. All of the parts specified except support 76 are practically standard construction for compasses, it being understood that the specific compass structure employed is not a part of the present invention and may be of any conventional design. Further details of the construction shown provides that the support 76 has two legs 77 and U-shaped end parts 78. A pinion 10 is rotatably mounted in each of the U-shaped end parts of the legs. Extending portions of the shafts on which the pinions are located are indicated at 11 in the drawings, the same being secured in a central position in the indicating magnet pieces 79. The hereinbefore disclosed sector gear construction 9 is mounted to freely oscillate on pins 82 which protude from spacer parts 81 soldered to the outside portion of the legs 77. The stationary spaces 81 also have securely positioned springs extending downwardly therefrom, the opposite ends of which are connected to the respective sector gears 9. Weights 6 include a slot so the same may be adjusted in position on the upwardly extending parts of the sector gears. Set screws or other suitable means are employed to locate the weights in the desired position on the gears. The compass construction proper constitutes the pendulous actuating means for the instrument in this instance. It will be consequently understood that any compass of suitable design having a center of gravity slightly below the point or center of swing for the instrument, as taught by the present inventive disclosure, could be used for this purpose. Also any desired type of mechanism operating on this principle could be utilized in this connection. The operation of the device is no different than that hereinbefore described except with the differentiating feature that the magnets 79 instead of the indicating hands 12 will be maintained in the proper and desired plane.

While I have shown and described many varied types and usages of my present inventive disclosure, I do not desire to limit myself to the specific forms illustrated, but may alter the construction and arrangement of parts as occasion requires without enlarging the scope of my invention or departing from the spirit thereof, as contained in the appended claims.

I claim as my invention:

1. A device of the character described operatively responsive to changes in velocity of the instrument comprising a pendulum having a center of gravity relatively near and below its point of suspension, said pendulum having a weight below its point of suspension located on a relatively stiff arm and including a weight above its point of suspension secured on a resilient arm, a supporting frame mounted upon the lower arm of the pendulum, an indicator located on a geared shaft corotatably secured in said supporting frame, a pivotally mounted sector gear on said frame meshing with the indicator shaft and operable by the resilient arm of the pendulum under the influence of the force of gravity thereon during operation of the device, the mechanism functioning to compensate for the movement of the pendulum to maintain the indicator thereof in a horizontal position.

2. An oscillative indicating instrument operatively responsive to changes in velocity thereof, comprising a pendulum having its center of gravity relatively near its point of suspension, said pendulum having a weight below its point of suspension located on a relatively stiff arm and including a weight above its point of suspension secured on a resilient arm, a supporting frame mounted upon the lower arm of the pendulum, the same housing an indicating device and a gravitationally responsive actuating mechanism, both of which are in connection with said resilient arm, said gravitationally responsive mechanism providing means for maintaining the indicator of the indicating device in a predetermined position through said resilient arm.

3. An indicating instrument comprising a pendulous body, a weight actuated resilient member forming a portion of the pendulous body, an indicating mechanism forming a portion of the pendulous body, and means connecting said member and mechanism whereby the force of gravity is employed through said weight actuated resilient member to maintain the indicator of the indicating mechanism in a predetermined position during operation of the instrument.

4. An indicating instrument comprising a pendulous body, having its center of gravity relatively near its point of suspension, a weight actuated resilient member, an indicating mechanism, said member and mechanism both forming a part of the pendulous body, and means operable by the weight actuated resilient member, through the force of gravity thereon, to maintain the indicator of the indicating mechanism in a predetermined position during operation of the instrument.

5. An indicating instrument comprising a pendulous body capable of swinging through a relatively large angle of deflection, a weight actuated resilient member forming a portion of the pendulous body, controlling actuation of said member being effected by the force of gravity upon the weight of the same and being proportional to the degree of movement of the pendulous body, an indicating mechanism forming a part of the pendulous body, and means connecting said member and mechanism operative to maintain the indicator of the indicating mechanism of the instrument in a predetermined position by the controlling actuation of said weight actuated resilient member.

6. An indicating instrument comprising a pendulous body, a weight supporting resilient member forming a portion of the pendulous body, an indicating mechanism forming a portion of the pendulous body, and means operable by said weight supporting resilient member to maintain the indicator of the indicating mechanism in a desired predetermined position during operation of the instrument.

7. An indicating instrument comprising a pendulum, having its center of gravity relatively near its point of suspension, a weight supporting resilient member forming a portion of the pendulum, a frame member mounted upon said pendulum, an indicating mechanism located on said frame member, both said frame member and indicating mechanism forming a part of the pendulum, and mechanism, situated on said frame member, connecting said weight supporting resilient member and the indicating mechanism operable by the force of gravity upon said weight supporting resilient member to maintain the indicator of the indicating mechanism of the instrument in a predetermined desired position.

8. An indicating instrument comprising a pendulum, a frame member mounted upon the pendulum, a weight actuated resilient member situated upon said frame member, an indicating mechanism on said frame member, said frame member, weight actuated resilient member and indicating mechanism being parts of the pendulum, and connecting mechanism for the weight actuated resilient member and the indicating mechanism whereby said member is operable, through the influence of the force of gravity thereon, to maintain the indicator of the indicating mechanism in a predetermined position during operation of the instrument.

9. An indicating instrument comprising a pendulum, a frame member mounted upon the pendulum, a pivotally mounted, resiliently controlled, weight supporting member located upon said frame member, an indicating mechanism on said frame member, and mechanism operable by said second named member, through the influence of the force of gravity thereon, to maintain the indicator of the indicating mechanism of the instrument in a predetermined position.

GEORGE B. MOROSS.